Dec. 1, 1931.    F. P. LAUFFER    1,834,409
METHOD OF AND MEANS FOR SECURING DAMPING MAGNETS TOGETHER
Filed June 13, 1929
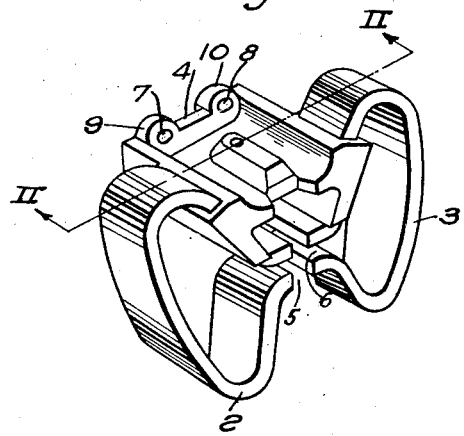
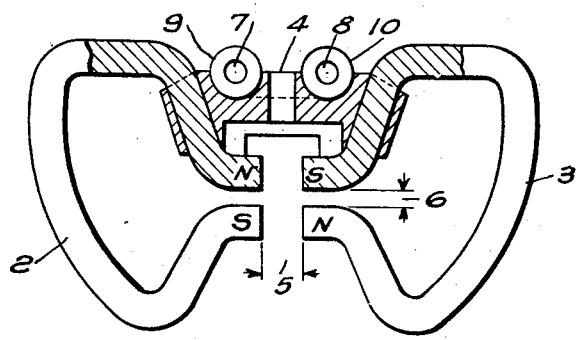
INVENTOR
Frank P. Lauffer.
BY
ATTORNEY Patented Dec. 1, 1931

1,834,409

UNITED STATES PATENT OFFICE

FRANK P. LAUFFER, OF IRWIN, PENNSYLVANIA, ASSIGNOR TO WESTINGHOUSE ELECTRIC & MANUFACTURING COMPANY, A CORPORATION OF PENNSYLVANIA

METHOD OF AND MEANS FOR SECURING DAMPING MAGNETS TOGETHER

Application filed June 13, 1929. Serial No. 370,513.

My invention relates to damping-magnet structures for integrating meters and relays and more particularly to methods of, and means, for securing magnets together.

My invention has for an object to provide a method of, and means for, securing a pair of damping magnets whereby they are substantially fixed with respect to each other.

Another object of my invention is to provide means for securing a pair of magnets with respect to each other without setting up stresses in the magnet structure.

A further object of my invention is to provide means for reducing the cost and increasing the efficiency of unitary magnet structures embodying a plurality of permanent magnets.

My invention is illustrated in the accompanying drawings to which reference is to be made in connection with the following description.

In the drawings:

Figure 1 is a view, in perspective, of a damping-magnet assembly constructed in accordance with my invention and Fig. 2 is a cross-sectional view of the magnet structure, taken on the line II—II of Fig. 1.

Two members 2 and 3 of substantially closed-C-shape are secured with respect to each other by a bracket 4. The members 2 and 3 are of a magnetizable material which, when subjected to a magnetic flux, becomes permanently magnetized. The bracket 4 is preferably of a light-weight, easily melted, non-magnetic metal, such as aluminum.

The members 2 and 3 are placed in a retaining mold and clamped in the position they are to occupy with respect to each other. Melted aluminum is then poured into the mold and, very shortly after it has solidified, it is cooled by being dipped in water. The temperature of the molten metal is such that the characteristics of the magnetic members 2 and 3 are not injuriously affected, that is, the temperature is below the critical temperature of the material of the members 2 and 3.

The cooling operation is resorted to in order to prevent the heat of the molded bracket from permeating the members 2 and 3, and to obviate any possibility of the magnetic material becoming annealed.

As shown in the drawings, the bracket 4 is molded around the upper ends of the members 2 and 3 to hold these members in fixed position with respect to each other. An air space 5 horizontally separates the ends of the members 2 and 3 and an air space 6 separates them vertically. The air space 6 is provided for the reception of a conducting disc (not shown), the movement of which is to be damped by the flux between the ends of the members 2 and 3. The disc may be a portion of a relay or an integrating meter, such as a watthour meter, as is well understood by those familiar with the art.

The bracket 4 is secured to the structure of the meter, in the well-known manner, by bolts cooperating with openings 7 and 8 in the extensions 9 and 10 provided at one end of the bracket in the molding operation.

It will be apparent that the bracket 4 may be, and preferably is, provided with the usual full-load adjusting shunts, as well as with temperature-compensating shunts, of which the material of the bracket itself may be a part.

The most desirable advance made by my invention over the prior art resides in the fact that, heretofore, the bracket 4 was pressed with great pressure by a powerful machine upon and around the ends of the members 2 and 3, thereby setting up physical stresses in the material of these members, which stresses weakened the permanent-magnetic properties thereof, whereas the bracket 4, when molded around the ends of members 2 and 3, in accordance with my invention, is subjected only to stresses resulting from the cooling of the material, the latter stresses are much less severe and more uniform than the former.

My device, in addition to securing the magnets together fixedly, may also be manufactured at a reduced cost, when compared with prior structures.

After the members 2 and 3 are secured into a unitary structure by the molded bracket 4, they may be magnetized in such manner that adjacent poles are of opposite polarity, as indicated by the letters N and S in the drawings. This arrangement has been found to be the most desirable to maintain the magnetic properties of the damping system constant.

I have described the principle of operation of my invention, together with the apparatus which I now consider to represent the best embodiment thereof; but I desire to have it understood that the apparatus shown and described is only illustrative and that the invention may be exemplified by other specific means.

I claim as my invention:

1. In combination, in an electrical instrument unit, a pair of strap-like permanent magnets of substantially uniform width and thickness throughout and bent to substantially C-shape, said magnets having pole-end portions disposed in spaced quadrature relation and the pole ends of each magnet being for disposition at the respective sides of an armature disk, and a homogeneous non-magnetic metal body molded to the magnets and having a section of substantially double-loop-shape for disposition entirely at one side of the disk, the loops of said body being disposed about the respective magnets spaced from the adjacent ends thereof, said body having portions between the magnets for attaching the unit to a support and mounting a shunt for cooperation with the magnets.

2. In combination, in an electrical instrument unit, a pair of permanent magnets of substantially C-shape, said magnets having pole-end portions disposed in spaced quadrature relation and the pole ends of each magnet being for disposition at the respective sides of an armature disk, and a homogeneous non-magnetic body molded in holding relation to the magnets having portions between the magnets for attaching the unit to a support and mounting a shunt for co-operation with the magnets.

In testimony whereof, I have hereunto subscribed my name this 7th day of June 1929.

FRANK P. LAUFFER.